(12) United States Patent
Chernoff et al.

(10) Patent No.: US 7,225,542 B2
(45) Date of Patent: Jun. 5, 2007

(54) VEHICLE BODY COMPARTMENT LID METHOD OF MANUFACTURING

(75) Inventors: Adrian B. Chernoff, Royal Oak, MI (US); Tommy E. White, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 133 days.

(21) Appl. No.: 10/763,937

(22) Filed: Jan. 23, 2004

(65) Prior Publication Data

US 2005/0161979 A1 Jul. 28, 2005

(51) Int. Cl.
*B21D 53/88* (2006.01)
*B60R 13/04* (2006.01)

(52) U.S. Cl. .............. 29/897.2; 29/897; 29/421.1

(58) Field of Classification Search .............. 29/897.2, 29/897, 897.32, 421.1, 423, 432, 421, 243.57, 29/243.58; 72/152, 464; 296/187.01, 191, 296/194, 219
See application file for complete search history.

(56) References Cited

U.S. PATENT DOCUMENTS

| | | | | |
|---|---|---|---|---|
| 3,890,696 | A | * | 6/1975 | Buske ................ 228/173.6 |
| 4,748,837 | A | * | 6/1988 | Kurosawa et al. ........... 72/63 |
| 5,186,251 | A | * | 2/1993 | Joshi ..................... 165/177 |
| 5,228,190 | A | * | 7/1993 | Sawa ....................... 29/715 |
| 5,239,753 | A | * | 8/1993 | Kalis et al. ............. 29/897.2 |
| 5,890,285 | A | * | 4/1999 | Pruitt et al. ............ 29/889.72 |
| 5,974,847 | A | | 11/1999 | Saunders et al. ........... 72/57 |
| 6,141,935 | A | * | 11/2000 | Artner et al. ............ 52/735.1 |
| 6,253,588 | B1 | | 7/2001 | Rashid et al. .............. 72/57 |
| 6,672,121 | B2 | * | 1/2004 | Carsley et al. ............. 72/57 |

* cited by examiner

*Primary Examiner*—John C. Hong
(74) *Attorney, Agent, or Firm*—Kathryn A. Marra

(57) ABSTRACT

A vehicle body compartment lid includes a unitary, one-piece panel. The panel has both an inner panel portion and an outer panel portion, and is bent or folded such that the inner panel portion and the outer panel portion are in juxtaposition with one another. A method of manufacturing a vehicle body compartment lid employing the panel is also provided. The panel is preferably formed using fluid pressure.

5 Claims, 2 Drawing Sheets

VEHICLE BODY COMPARTMENT LID METHOD OF MANUFACTURING

TECHNICAL FIELD

This invention relates to vehicle body compartment lids characterized by a unitary panel that forms an inner panel and an outer panel.

BACKGROUND OF THE INVENTION

Vehicle bodies typically include at least one compartment accessible from the outside of the vehicle through an opening. Such compartments include trunks and engine compartments. A hinged lid, such as a hood or decklid, is attached to the vehicle body and pivotable between an open position in which the compartment is accessible, and a closed position in which the lid obstructs the opening.

A prior art vehicle body compartment lid typically includes an inner panel and an outer panel that are formed from separate metal blanks. The inner panel is a structural member that provides structural rigidity to the compartment lid and supports the outer panel. The outer panel forms at least a portion of the exposed, exterior surface of the lid and, correspondingly, the vehicle to which the lid is attached. The inner panel and the outer panel are joined together substantially along their respective peripheries by welding, hemming, etc.

SUMMARY OF THE INVENTION

A vehicle body compartment lid is provided that comprises a unitary, i.e., one-piece, panel having both an inner panel portion and an outer panel portion. The panel is folded or bent so that the inner panel portion and the outer panel portion are at least partially in juxtaposition with one another. The vehicle body compartment lid has fewer tolerance stack-ups and enables better dimensional control in manufacturing compared to the prior art because the inner panel portion and the outer panel portion are part of a single piece of material.

A method of manufacturing a body compartment lid having a one-piece panel formed to include an inner panel portion and an outer panel portion is also provided. The method includes providing a unitary panel having a first portion formed as a vehicle body compartment lid outer panel and a second portion formed as a vehicle body compartment lid inner panel, and bending the panel to form a crease between the first portion and the second portion. A fluid forming technique, such as superplastic forming, quick plastic forming, and sheet hydroforming, is preferably employed to form the panel from a metal blank or sheet.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
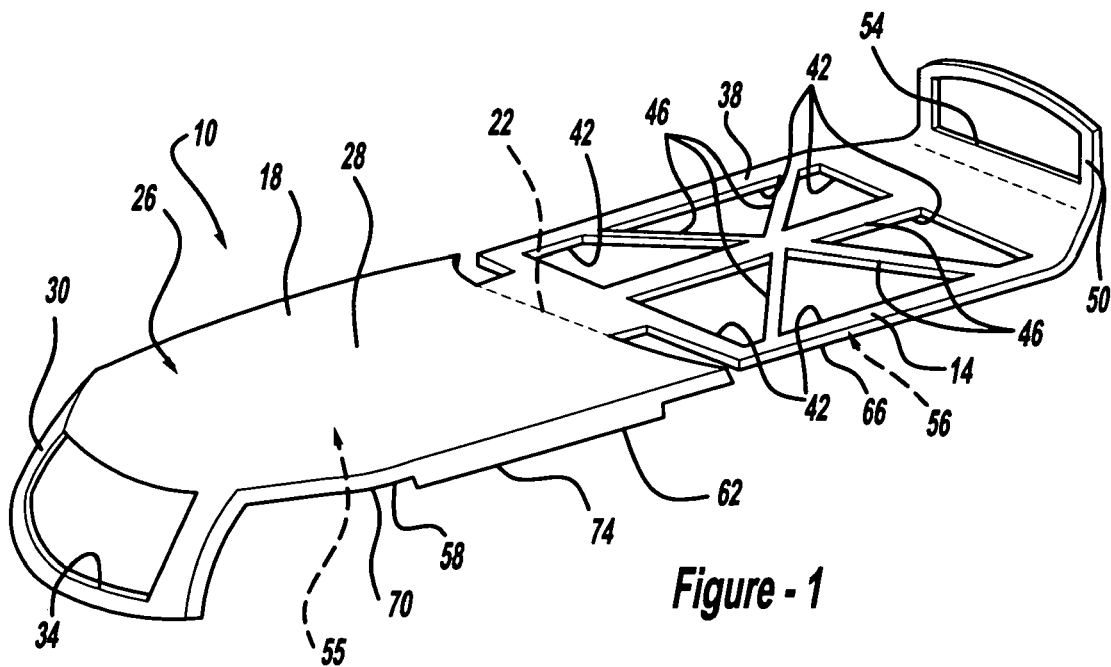
FIG. 1 is a perspective schematic view of a unitary panel having an inner panel portion and an outer panel portion in a progressive initial configuration.
Figure 4:
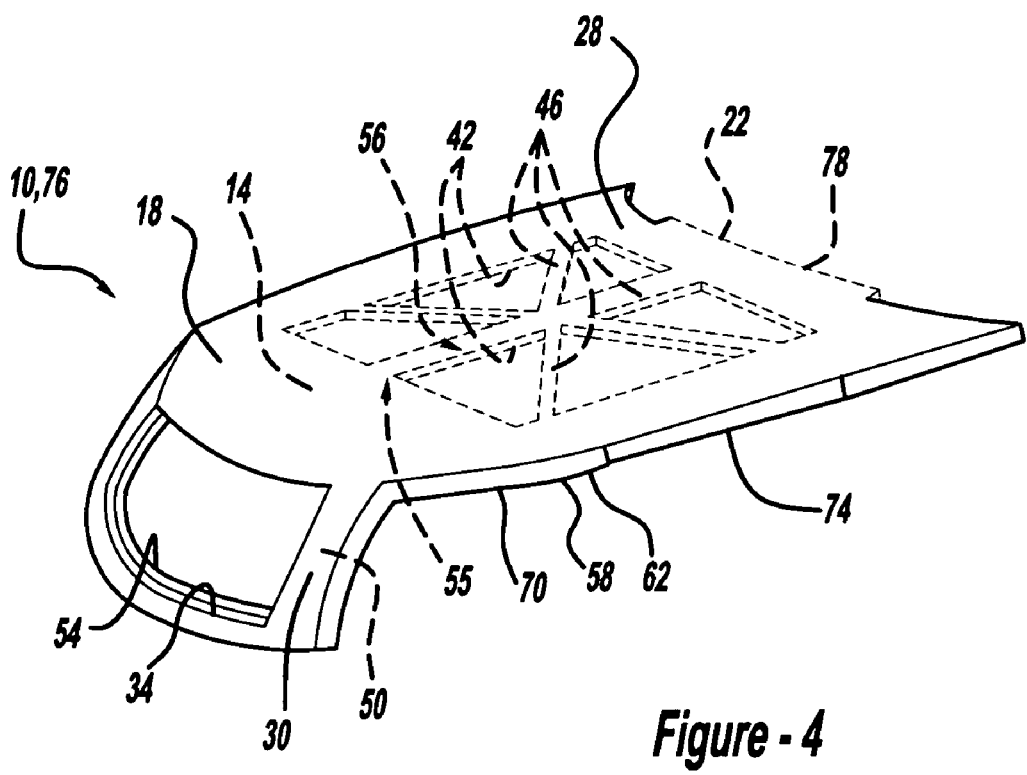
FIG. 4 is a perspective schematic view of a vehicle body compartment lid including the panel of FIGS. 1–3 in a progressive final configuration.

FIG. 1 is a schematic depiction of a unitary, i.e., one-piece, panel 10 in a progressive initial configuration. The panel 10 is characterized by an inner panel portion 14 and an outer panel portion 18. The inner panel portion 14 and the outer panel portion 18 are separated by a fold line 22 at which the panel 10 is bendable or foldable to at least partially form a vehicle body compartment lid such as a hood, as depicted in FIG. 4, or a decklid.

The outer panel portion 18 has a contoured surface 26 that partially defines the exterior surface of a vehicle. A portion 28 of the outer panel is configured to extend generally horizontally above a vehicle compartment, such as an engine compartment or trunk. The outer panel portion 18 in the embodiment depicted also includes a portion 30 configured to extend generally vertically when the lid is attached to a vehicle body in a closed position. Portion 30 defines a grill opening 34. A panel forming a decklid would not have a grill opening in portion 30, but may have an opening for a center high-mounted stop light.

The inner panel portion 14 preferably includes a portion 38 configured to extend generally horizontally above the vehicle compartment. Portion 38 defines a plurality of openings 42 between a plurality of strengthening formations 46. Those skilled in the art will recognize a variety of inner panel portion configurations suitable for providing structural rigidity to a compartment lid that may be employed within the scope of the claimed invention. For example, strengthening formations 46 may be U-shaped channels. The inner panel portion 14 also includes a portion 50 that is configured to extend generally vertically and defines a grill opening 54. Within the scope of the claimed invention, the panel may or may not have vertically-extending portions 30, 50. The outer panel portion 18 includes a surface 55 opposite the exterior surface 26. The inner panel portion includes a surface 56 on the same side of the panel 10 as, and on the opposite side of the fold line 22 from, surface 55.

The panel 10 is characterized by a periphery 58 and a peripheral edge 62. The inner panel periphery 66 is the segment of the periphery 58 on the inner panel portion side of the fold line 22. The outer panel periphery 70 is the segment of the periphery 58 on the outer panel portion side of the fold line 22. The outer panel portion preferably includes hem flanges 74 at the outer panel periphery 70 to facilitate the joining of the inner panel portion 14 to the outer panel portion 18 along their respective peripheries 66, 70.

Those skilled in the art will recognize a variety of materials that may be employed to form the panel 10, including various metals and plastics. Those skilled in the art will also recognize a variety of forming techniques that may be employed within the scope of the claimed invention to form the contours of panel 10, such as, but not limited to, stamping, injection molding, etc. However, a fluid forming technique such as quick plastic forming, superplastic form ing, or sheet hydroforming is preferably employed to form the contours of the panel 10 so that the panel 10 has a more complex shape than is generally achievable with stamping. Holes, apertures, and openings are cut, punched, etc, after the contours are formed.

Superplastic forming is described in U.S. Pat. No. 5,974,847, issued Nov. 2, 1999 to Saunders, et al, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. A panel 10 of the design discussed above can be fabricated in one piece using such techniques.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make this panel 10. These materials and other metal matrix composites could also be used to make the panel 10 of this invention, if desired.

In an example of superplastic forming (SPF), a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 s$^{-1}$. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Quick plastic forming is described in U.S. Pat. No. 6,253,588, issued Jul. 3, 2001 to Rashid, et al, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like an SPF-formed part, at much higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming (at least for the automobile industry) times are achieved.

It may be desirable for different parts of the panel 10 to have different thicknesses. For example, the inner panel portion 14 may be thicker than the outer panel portion 18, or the regions on the inner panel at which hinges (not shown) or a striker (not shown) are mounted may be reinforced with more material. Varying panel thicknesses may be achieved by employing tailor-welded blanks in the fluid forming process. The use of tailor-welded blanks is described in commonly-assigned U.S. patent application Ser. No. 10/337,220 filed Jan. 6, 2003, which is hereby incorporated by reference in its entirety.

Figure 2:
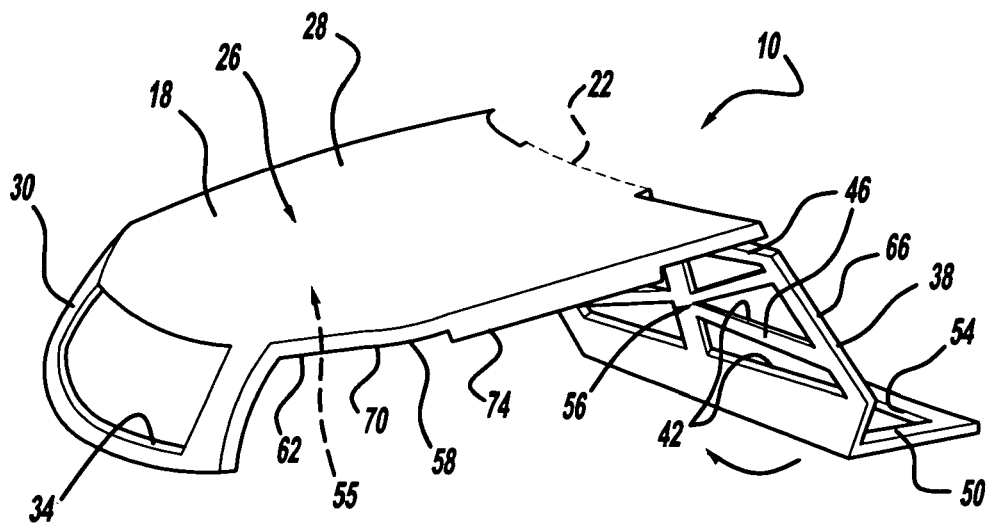
FIG. 2 is a perspective schematic view of the panel of FIG. 1 in a progressive first intermediate configuration in which the panel is partially bent along a fold line.
Figure 3:
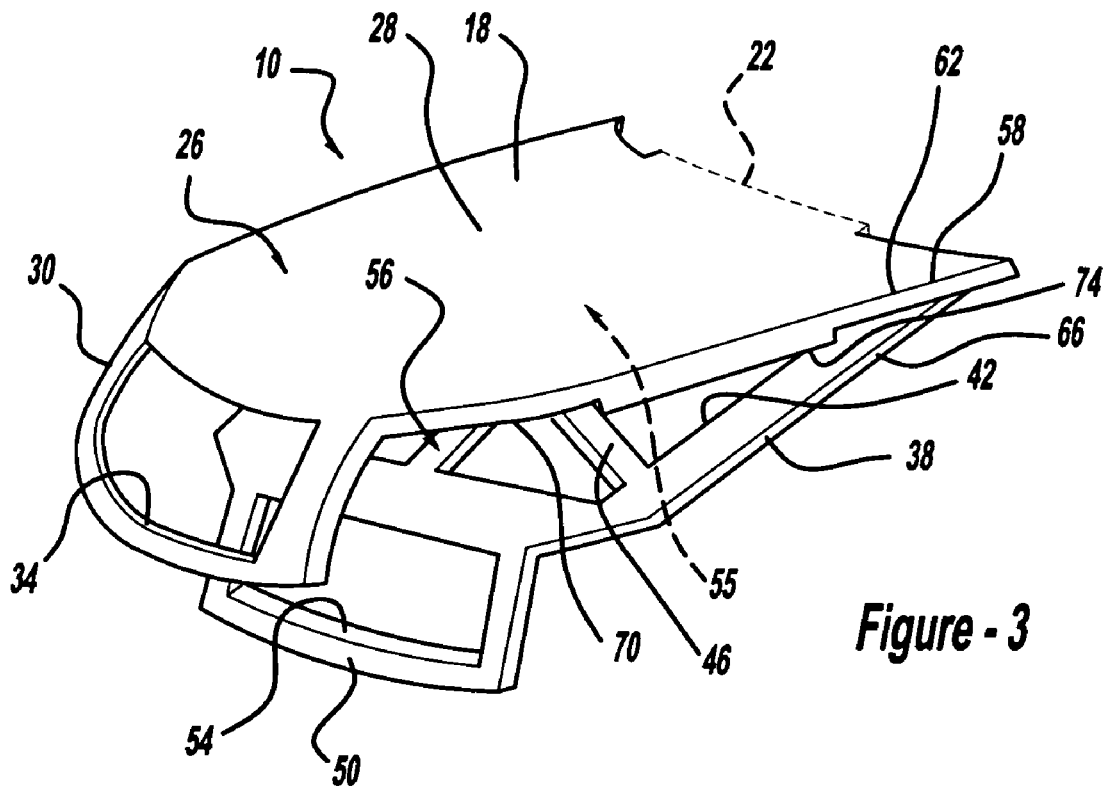
FIG. 3 is a perspective schematic view of the panel of FIGS. 1 and 2 in a progressive second intermediate configuration.

Referring to FIGS. 2 and 3, wherein like reference numbers refer to like components from FIG. 1, the panel 10 is depicted in a first progressive intermediate configuration and a second progressive intermediate configuration, respectively, in which the panel 10 is bent or folded along the fold line 22.

Referring to FIG. 4, wherein like reference numbers refer to like components from FIGS. 1–3, the panel 10 is depicted in a progressive final configuration in which the panel 10 is further folded or bent along the fold line 22 so that the inner panel portion 14 is in juxtaposition with the outer panel portion 18 to form a vehicle hood 76. More specifically, the panel 10 is sufficiently bent such that surface 55 is in juxtaposition with surface 56. In other words, surface 55 faces, or opposes, surface 56.

The hem flanges 74 are preferably bent around the inner panel periphery 66 to join portions of the inner panel periphery 66 and the outer panel periphery 62. Thus, a portion of the inner panel periphery substantially continuously abuts a portion of the outer panel periphery. Those skilled in the art will recognize a variety of other joining techniques, such as adhesive bonding, welding, etc, that may be employed within the scope of the claimed invention to join the inner panel portion 14 and the outer panel portion 18.

The inner panel portion 14 and the outer panel portion 18 are separated by a crease 78 formed at the fold line 22. In the context of the present invention, a "crease" is a portion of material that has been subjected to plastic deformation from bending or folding. Within the scope of the claimed invention, the crease may be formed along any suitable edge of a body compartment lid.

The inner panel grill opening 54 is aligned with the outer panel grill opening 34.

While the best mode for carrying out the invention has been described in detail, those familiar with the art to which this invention relates will recognize various alternative designs and embodiments for practicing the invention within the scope of the appended claims.

The invention claimed is:

1. A method of manufacturing a vehicle body compartment lid, the method comprising:
    providing a unitary panel having a first portion formed as a vehicle body compartment lid outer panel and a second portion formed as a vehicle body compartment lid inner panel; and
    bending the panel to form a crease between the first portion and the second portion;
    wherein the method further comprises forming a sheet to produce the panel; wherein said forming the sheet includes placing the sheet in its substantially unformed, flat state between first and second die members movable between a die open position, for insertion of said sheet in its flat state and removal of the formed panel, and a die closed position in which said dies sealingly engage the periphery of said sheet for stretch forming of the die enclosed area of the sheet utilizing differential gas pressure, said first die member having a forming surface and defining a cavity between said forming surface and a first surface of said sheet, said second die having a sheet metal shaping surface opposite said cavity, said dies being in said die open position and said sheet being positioned between said preform surface and said cavity;
    heating said sheet to a stretch forming temperature;
    moving said dies to their closed position such that said first die engages the periphery of said sheet and pulls the heated sheet against said second die shaping surface to draw sheet material into said cavity so that said sheet is no longer flat and more sheet material is disposed within its sealingly engaged periphery than if the sheet had remained flat; and
    applying gas pressure to the second side of said sheet to stretch the sheet into conformity with said first die forming surface.

2. The method of claim 1, wherein said sheet is comprised of an aluminum alloy.

3. The method of claim 2, wherein said sheet is superplastic formable and is heated to a superplastic-forming temperature before or during die closure.

4. A method of manufacturing a vehicle body compartment lid, the method comprising:
    providing a unitary panel having a first portion formed as a vehicle body compartment lid outer panel and a second portion formed as a vehicle body compartment lid inner panel; and
    bending the panel to form a crease between the first portion and the second portion;
    wherein the method further comprises forming a sheet to produce the panel, wherein the sheet is comprised of a magnesium-containing, aluminum alloy, said alloy comprising up to about 6% by weight magnesium and having a microstructure characterized by a grain size in the range of about 5 to 30 micrometers, and wherein said forming the sheet includes heating said sheet to a temperature in the range of about 400° C. to about 510° C.; and
    stretching at least a portion of the heated sheet so that one side of the sheet is brought into conformance with a shaping surface by applying working gas pressure to the opposite side of the sheet, said stretching being accomplished by continually increasing said pressure from ambient pressure to a final stretching pressure in the range of about 250 psi to about 500 psi above ambient pressure and completing said stretching within a period of up to about 12 minutes.

5. The method of claim 4, further comprising increasing the rate of increase of said pressure at a time after about one minute of application of said pressure to a final stretching pressure in said range of about 250 psi to about 500 psi.

* * * * *